United States Patent
Jones

(10) Patent No.: US 7,772,137 B2
(45) Date of Patent: Aug. 10, 2010

(54) BREATHABLE MATERIALS COMPRISING LOW-ELONGATION FABRICS, AND METHODS

(75) Inventor: Gregory K. Jones, Lebanon, OH (US)

(73) Assignee: Clopay Plastic Products Company, Inc., Mason, OH (US)

( * ) Notice: Subject to any disclaimer, the term of this patent is extended or adjusted under 35 U.S.C. 154(b) by 880 days.

(21) Appl. No.: 10/622,790

(22) Filed: Jul. 18, 2003

(65) Prior Publication Data

US 2004/0016502 A1    Jan. 29, 2004

Related U.S. Application Data

(60) Provisional application No. 60/398,870, filed on Jul. 26, 2002.

(51) Int. Cl.
B32B 27/12 (2006.01)
B32B 27/04 (2006.01)

(52) U.S. Cl. .............................. 442/49; 442/50; 442/58; 442/76; 442/77; 442/401

(58) Field of Classification Search .................. 442/49, 442/50, 58, 76, 77, 401
See application file for complete search history.

(56) References Cited

U.S. PATENT DOCUMENTS

| | | | |
|---|---|---|---|
| 4,929,303 A | 5/1990 | Sheth | |
| 5,422,172 A | 6/1995 | Wu | |
| 5,861,074 A | 1/1999 | Wu | |
| 5,865,926 A | 2/1999 | Wu et al. | |
| 5,910,225 A | 6/1999 | McAmish et al. | |
| 6,258,308 B1 | 7/2001 | Brady et al. | |
| 6,264,864 B1 | 7/2001 | Mackay | |
| 6,359,050 B1 | 3/2002 | Dohrer et al. | |
| 2002/0071944 A1* | 6/2002 | Gardner et al. | 428/198 |
| 2004/0023585 A1* | 2/2004 | Carroll et al. | 442/381 |
| 2004/0029469 A1 | 2/2004 | Anderson et al. | |
| 2004/0147636 A1* | 7/2004 | Calhoun et al. | 523/200 |

FOREIGN PATENT DOCUMENTS

| | | |
|---|---|---|
| EP | 0302597 | 2/1989 |
| WO | WO0160605 | 8/2001 |

OTHER PUBLICATIONS http://www.clafusa.com, 8 pages, dated Mar. 29, 2002.

* cited by examiner

*Primary Examiner*—Ula C Ruddock
(74) *Attorney, Agent, or Firm*—Dinsmore & Shohl LLP

(57) ABSTRACT

Breathable materials comprise a low-elongation fabric layer and a microporous coating thereon. The microporous coating comprises a crystalline polymer composition and a filler. The materials are suitable for use in various applications including housewrap and other construction embodiments. Methods of making a breathable material comprise extrusion coating a low-elongation fabric layer with a composition comprising a crystalline polymer composition and a filler to form a coating on the low-elongation fabric layer, and incrementally stretching the coated nonwoven layer to render the coating microporous.

29 Claims, No Drawings

BREATHABLE MATERIALS COMPRISING LOW-ELONGATION FABRICS, AND METHODS

RELATED APPLICATION

The present application claims priority under 35 U.S.C. §119 of U.S. provisional application Ser. No. 60/398,870 filed Jul. 26, 2002.

FIELD OF THE INVENTION

The present invention is directed to breathable materials comprising low elongation fabric materials, suitable for use, for example, as construction materials such as housewrap materials, and to methods for making such breathable materials.

BACKGROUND OF THE INVENTION

Housewrap materials are typically attached or secured to the outer surface of framing or sheathing in the walls of buildings, especially in cold climates. Housewrap materials must be permeable to water vapor to allow water vapor to escape from the wall to which the film is secured to prevent, for example, water damage to the walls and/or growth of molds or the like. On the other hand, the housewrap materials should be sufficiently impermeable to air and liquids to insulate the wall against wind and rain or other precipitation. Further, housewrap materials should have adequate tensile and physical properties such as break strength, elongation, tear strength, shrinkage and puncture strength to avoid damage during installation and to facilitate durability.

To provide housewrap materials and other breathable materials suitable for construction and similar heavy duty use with sufficient strength and toughness, it is often desirable to use strong and/or tough nonwoven and/or woven materials. Typically, such nonwoven and woven materials exhibit relatively low elongation capabilities, i.e., less than about 30% elongation, which can limit the techniques employed to form composite materials therefrom.

The Sheth U.S. Pat. No. 4,929,303 discloses composite breathable housewrap materials which comprise a breathable film formed of linear low density polyethylene and a nonwoven fabric formed of cross-laminated fibers. The breathable film is formed by cast extruding a precursor film onto a roller, stretching the precursor film to impart permeability, heating the nonwoven fabric, and pressing the heated fabric to the film to bond the fabric and the breathable film. Owing to these successive processing steps, the manufacture of the disclosed housewrap materials can be somewhat cumbersome and expensive.

Accordingly, a need exists for improved breathable materials, including those which may employ relatively strong or tough nonwoven layers, and to methods for facilitating the manufacture of such materials.

SUMMARY OF THE INVENTION

It is therefore an object of the invention to provide novel breathable materials which overcome various disadvantages of the prior art, and which are particularly suitable for use in applications requiring high strength, such as construction applications. It is an additional object to provide novel methods for making such breathable materials.

These and additional objects are provided according to the present invention. In one embodiment, the invention is directed to breathable materials. The breathable materials comprise a low-elongation fabric layer and a microporous coating thereon. The microporous coating comprises a crystalline polymer composition and a filler.

In another embodiment, the invention is directed to breathable housewrap materials. The breathable housewrap materials comprise a low-elongation polyolefin nonwoven layer and a microporous coating comprising high density polyethylene and a filler thereon.

In yet another embodiment, the invention is directed to methods of making a breathable material. The methods comprise extrusion coating a low-elongation fabric layer with a composition comprising a crystalline polymer composition and a filler to form a coating on the low-elongation fabric layer, and incrementally stretching the coated layer to render the coating microporous.

The breathable materials according to the invention are advantageous in that they exhibit a desirable combination of strength, breathability, and liquid permeability, and may be easily manufactured by the methods of the invention. These and additional objects and advantages provided by the breathable materials, housewrap materials and methods of the invention will be more fully apparent in view of the following detailed description.

DETAILED DESCRIPTION

The present invention is directed to breathable materials for use in various applications. In one embodiment, the breathable materials are suitable for use as construction materials, including but not limited to, housewrap materials, flashing, roofing underlayment, for use, for example, under shingles, tiles, or the like, as tar paper replacement, and/or in other construction applications. However, one skilled in the art will recognize from the present description other specific applications and uses of the breathable materials which are within the scope of the invention.

The breathable materials according to the invention comprise a low-elongation fabric layer and a microporous coating thereon. Within the scope of the invention, the term "low elongation" generally refers to a material which exhibits less than about 30% elongation, for example as measured according to ASTM D5034. The low-elongation layer should have a structure which avoids substantially blocking the micropores of the coating. In one embodiment, the low-elongation layer generally has an open structure such as a mesh or scrim. It is often desirable that the low elongation layer is formed of a material or materials which are also relatively strong and tough. For example, in selected embodiments, the low-elongation layer may exhibit a tensile strength of at least about 20 lbs./in. as measured according to ASTM D-882.

The low-elongation layer may be either woven or nonwoven fabric, or may be a combination of woven fabric and nonwoven fabric as desired. Additionally, the low-elongation fabric layer may be formed of any desirable material. In one embodiment, the low-elongation layer is a nonwoven or woven fabric formed of one or more polyolefins, for example polyethylene, polypropylene, or combinations thereof. In a specific embodiment, the low-elongation layer is a nonwoven layer comprising a polyolefin cross-laminated open mesh. In a more specific embodiment, the low-elongation layer is a nonwoven layer comprising polyethylene cross-laminated open mesh. Such materials are commercially available from Atlanta Nisseki CLAF, Inc. under the trade name CLAF®. The CLAF® materials are available in a number of grades having varying combinations of physical properties which are suitable for use in the invention. In one embodiment, the low-elongation layer is a nonwoven layer comprising polyethylene cross-laminated open mesh having a basis weight of greater than about 0.7 oz/yd$^2$.

In another embodiment, the low-elongation fabric layer is a nonwoven layer comprising a spunbonded material, for example a spunbonded polyolefin such as polyethylene, polypropylene, or combinations thereof. Suitable spunbonded nonwovens may have a basis weight greater than about 0.7 oz/yd$^2$. In a more specific embodiment, the low-elongation layer is a nonwoven layer comprising spunbonded polypropylene having a basis weight equal to or greater than about 1 oz/yd$^2$, and more specifically, spunbonded polypropylene having a basis weight of greater than about 1.5 oz/yd$^2$. Spunbonded nonwoven materials suitable for use in the breathable materials may have a denier of from about 2 to about 15, more specifically from about 10 to about 12, with spunbonded materials having a denier at the higher end of this range being preferred for use in applications such as housewrap materials. Such spunbonded nonwovens are known in the art and are commercially available, for example, from Reemay, Inc. under the trade name TYPAR®.

In another embodiment, the low-elongation layer is a nonwoven layer comprising a flash spun nonwoven material such as a flash spun high density polyethylene nonwoven material commercially available from DuPont under the trade name TYVEK®. The flash spun nonwoven materials are available in a range of basis weights and are suitable for use in the breathable materials of the invention. In certain embodiments, the flash spun nonwoven materials will have a basis weight in a range of from about 0.7 to about 4 oz/yd$^2$.

Other woven and/or nonwoven materials known in the art may be used as the low elongation fabric layer of the breathable materials of the invention.

The microporous coating which is provided on the low-elongation fabric in the breathable materials of the invention comprises a crystalline polymer composition and a filler. Within the scope of the present invention, the term "crystalline polymer composition" refers to a polymer composition having greater than 50% of the polymer components in crystalline form. The present inventor has recognized that a crystalline polymer composition, in combination with the filler, will be rendered microporous by a relatively small degree of stretching which is tolerated by the low elongation fabric layer. Various crystalline polymers may be employed in the coating, alone or in combination. In a specific embodiment, the crystalline polymer comprises high density polyethylene (HDPE), which as known in the art, designates a polyethylene having a measurable crystalline content and a density of at least about 0.94 g/cc. In a further embodiment, the crystalline polymer composition has a density greater than about 0.945 g/cc.

Suitable fillers for use in the respective film layers include, but are not limited to, various organic and/or inorganic materials. In a specific embodiment, the filler may comprise one or more of inorganic materials such as metal oxides, metal hydroxides, metal carbonates and the like. Preferred fillers include, but are not limited to, calcium carbonate, diatomaceous earth, titanium dioxide, and mixtures thereof. The particle size of the filler may be selected in order to influence the micropore size in the coating and consequently the breathability of the material product. Typically, filler having an average particle size of from about 0.5 to about 5 microns is suitable, although fillers of smaller or larger size may also be employed. The filler may optionally include a surface coating to facilitate dispersion of the filler in the crystalline polymer composition, to increase the ability of the filler to repel water, and/or to increase incompatibility of the filler with the crystalline polymer composition and the formation of micropores at the vicinity of the filler.

The filler is included in the microporous coating layer in an amount suitable to provide the desired breathability. Generally, the filler may be employed in an amount of from about 25 to about 75 weight percent, based on the weight of the microporous coating layer.

The coating may be formed as one layer or as multiple layers on the fabric layer. In one embodiment, the coating comprises a single layer film which, as discussed in further detail below, may be formed on the fabric layer by an extrusion coating process. In a further embodiment, the coating comprises a multiple layer (two or more layer) film formed, for example, by extrusion lamination of two or more film layers. In this embodiment, at least one of the film layers comprises a crystalline polymer composition and a filler, but it is not required, although it is permitted, that all of the film layers comprise a crystalline polymer composition and a filler. In a specific embodiment, the coating comprises a three layer laminate film formed by extrusion lamination of a core layer comprising the crystalline polymer composition and a filler, between two outer layers formed of a polymer composition comprising 50% or less by weight of polymer components in crystalline form, for example, medium density polyethylene, low density polyethylene, linear low density polyethylene, polypropylene, or the like, and filler.

Optionally, the breathable materials according to the invention may further comprise a second woven or nonwoven fabric layer, wherein the microporous coating layer is arranged between the low-elongation fabric layer and the second fabric layer. Suitably, the second nonwoven layer may be of a similar form and composition as the low elongation fabric layer, or the second fabric layer may be of a different form and/or composition. In one embodiment, the second fabric layer comprises a spun bonded nonwoven layer, for example a spun bonded polypropylene.

The breathability of the materials according to the invention may be controlled as desired for the intended application of the materials. When employed as housewrap materials, the materials suitably have a water vapor transmission rate of greater than about 150 g/m$^2$*24 hr, more specifically greater than about 300 g/m$^2$*24 hr, and even more specifically greater than about 500 g/m$^2$*24 hr, as measured according to ASTM E-96E. Typically, such materials do not require high water vapor transmission rates and will often have a water vapor transmission rate of less than about 2000 g/m$^2$*24 hr. It is understood however that materials having higher water vapor transmission rates are equally within the scope of the invention.

In one embodiment of the invention, the breathable material is manufactured by extrusion coating the low-elongation fabric layer with a composition comprising a crystalline polymer composition and a filler to form a coating on the low-elongation layer, and incrementally stretching the coated low-elongation layer to render the coating microporous. As noted above, the crystalline polymer composition, in combination with the filler, will be rendered microporous by a relatively small degree of stretching which is tolerated by the low elongation nonwoven layer. In one embodiment, the coated low-elongation layer is incrementally stretched to a permanent elongation less than about 5%. In an additional embodiment, the coated low-elongation layer is incrementally stretched to a permanent elongation less than about 2%, more specifically less than about 1%. In yet further embodiments, the coated low-elongation layer is incrementally stretched without any permanent elongation of the material.

For example, using techniques well known in the art, a coating in the form of a film may be extruded from an extruder through a die and past an air knife or other cooling device into a nip formed between rolls. The extrusion is conducted at or above the melt temperature of the crystalline polymer composition of the coating material, typically on the order of about 400-500° F. Conventionally, the nip is formed between a metal roll and a rubber roll. The low-elongation fabric layer may be provided as a web, for example supplied from a roll, and the coating film and the low-elongation fabric web are passed through the nip of the rolls to adhere the coating to the low-elongation fabric web surface. The resulting coated low-elongation fabric is then subjected to incremental stretching.

More specifically, the incremental stretching may be conducted in a cross direction, referred to herein as CD intermesh stretching, in a machine direction, referred to herein as MD intermesh stretching, or in both the cross direction and the machine direction.

A CD intermeshing stretcher typically comprises a pair of gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll. Air cylinders are typically employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated. The drive for the CD intermeshing stretcher must operate both upper and lower intermeshing rolls except in the case of intermeshing stretching of materials with a relatively high coefficient of friction.

The CD intermeshing elements are typically machined from solid material but can best be described as an alternating stack of two different diameter disks. In one embodiment, the intermeshing disks are about 6" in diameter, about 0.031" thick, and have a full radius on their edge. The spacer disks separating the intermeshing disks are about 5.5" in diameter and about 0.069" in thickness. Two rolls of this configuration would be able to be intermeshed up to 0.231" leaving 0.019" clearance for material on all sides. This CD intermeshing element configuration would have a 0.100" pitch.

The MD intermeshing stretching equipment is typically identical to the CD intermeshing stretching equipment except for the design of the intermeshing rolls. The MD intermeshing rolls closely resemble fine pitch spur gears. In one embodiment, the rolls have a 5.933" diameter, 0.100" pitch, 30 diametral pitch, 14½° pressure angle, and are basically a long addendum, topped gear. A second pass may be taken on these rolls with the gear hob offset 0.010" to provide a narrowed tooth with more clearance. With about 0.090" of engagement, this configuration will have about 0.010" clearance on the sides for material thickness.

The engagement of the intermeshing roll elements may be adjusted in order to provide the micropores in the coating. In one embodiment, the engagement of the intermeshing roll elements is at least about 0.012 inch, more specifically from about 0.012 inch to about 0.020 inch, 0.030 inch, or more. Since the intermeshing elements are typically capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion may be assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

In one embodiment, the breathable material is incrementally stretched in the machine direction only. As a result, the breathable material may be easily applied as a housewrap material from a roll with the corrugations resulting from the machine direction intermeshing oriented in a vertical position.

Generally, the breathable materials of the invention may be rendered breathable at low elongation and may be prepared using lower elongation techniques as compared with conventional breathable materials. Lower elongation processing allows the use of smaller engagement depths on intermeshing rollers in the stretching process. Obtaining desired levels of microporosity at lower elongation levels allows the materials to be stretched less than conventional breathable materials and therefore reduces and/or substantially eliminates material damage which may occur with more rigorous stretching generally required to obtain breathable materials containing extrusion coatings having lower density polymer compositions.

Thus, in one embodiment, for example, the coated low-elongation fabric may be conducted past an optional preheated roller and to an incremental stretch section where the coated low-elongation fabric is passed through incremental machine direction (MD) stretcher rollers to form a breathable, incrementally stretched material. The material may optionally be passed through an additional stretch section where it is subjected to further stretching. For example, the material may be conducted past an optional preheated roller and through incremental cross direction (CD) stretcher rollers.

Example 1

In this example, a breathable material according to the invention is prepared. Specifically, a coating layer comprising high density polyethylene having a density greater than about 0.945 g/cc is extrusion laminated at one surface to a nonwoven layer comprising polyethylene cross-laminated open mesh. The nonwoven layer is available under the trade name CLAF® and has a basis weight of about 0.91 oz/yd$^2$. The CLAF® nonwoven exhibits an elongation of about 20% both in the machine direction and the cross direction. The coating layer is extrusion laminated at its other surface to a spunbond polypropylene nonwoven having a basis weight of about 1 oz/yd$^2$ and a denier of about 2. The coating layer has a basis weight of 30 g/m$^2$. The resulting material is subjected to CD intermesh stretching using an engagement depth of about 15 mils and MD intermesh stretching using an engagement depth of about 30 mils to render the high density polyethylene extrusion coating layer microporous and to provide a breathable material. The breathable material is liquid impermeable and exhibits a moisture vapor transmission rate of greater than about 150 g/m²*24 hr. The air permeability of the material is measured by a procedure wherein the volumetric flow rate of air passing through the sample is measured when a supply of air at 90 psi is presented to one side of a test sample. The measured air permeability is 83 ml/min/cm².

For comparison purposes, a similar material is prepared wherein the high density polyethylene-containing extrusion coating is substituted with a linear low density polyethylene extrusion coating of similar basis weight. CD intermesh stretching is conducted with an engagement depth of 20 mil and MD intermesh stretching is conducted with an engagement depth of 30 mil. The comparison material is liquid impervious and breathable and using the air permeability test described above exhibits an airflow of about 78 ml/min/cm².

Thus, the inventive breathable material exhibits equivalent or better breathability at lower elongation as evidenced by the smaller CD engagement depth which is employed in the processing for the inventive breathable material as compared with that of the comparison material. It is surprising and unexpected that the breathable material of the invention exhibits good microporosity at lower elongation. Moreover, it is advantageous that the breathable material according to the present invention exhibits good breathability at lower elongation so that fabric damage often incurred during rigorous stretching operations can be reduced and/or substantially avoided.

Example 2

This example demonstrates a breathable material according to the invention and comprising a multiplayer microporous coating. A 36 g/m² three layer "ABA" coating is extrusion laminated to a 2.3 oz/yd² low elongation spun bonded polypropylene (SBPP) nonwoven fabric layer. Each "A" layer comprises a 9 g/m² layer formed from a composition comprising 45% polypropylene, 50% calcium carbonate, and 5% low density polyethylene (LDPE). The core "B" layer is an 18 g/m² layer and comprises 53% calcium carbonate, 41% high density polyethylene, 4% titanium dioxide, 1% CaO masterbatch, and 1% processing aid. The laminate is intermeshed immediately after passing over an unheated metal roll at 200 fpm. The MD intermeshing engagement is 40 mil. The sample is not CD intermeshed. Air permeability is measured as described in Example 1 as 41 cc/min/cm².

For comparison purposes, a comparative breathable material comprising a multilayer microporous coating is prepared by extrusion laminating a 36 g/m² three layer "ABA" coating to a 2.3 oz/yd² SBPP nonwoven fabric layer. Each "A" layer comprises a 9 g/m² layer formed from a composition comprising 45% polypropylene, 50% calcium carbonate, and 5% LDPE. The core "B" layer is an 18 g/m² layer and comprises 53% calcium carbonate, 41% medium density polyethylene, 4% titanium dioxide, 1% CaO masterbatch, and 1% processing aid. The laminate is intermeshed after passing over an unheated metal roll at 200 fpm. The MD intermeshing engagement is 40 mil. The sample is not CD intermeshed. Measured air permeability is 21 cc/min/cm².

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. A breathable material, comprising a low-elongation fabric layer exhibiting less than about 30% elongation as measured according to ASTM D5034 in at least one direction, and a microporous coating thereon, the microporous coating comprising a crystalline polymer composition and a filler.

2. A breathable material according to claim 1, wherein the low-elongation fabric layer comprises a low-elongation nonwoven layer.

3. A breathable material according to claim 2, wherein the low-elongation nonwoven layer comprises polyolefin cross-laminated open mesh.

4. A breathable material according to claim 3, wherein the low-elongation nonwoven layer comprises polyethylene cross-laminated open mesh having a basis weight of greater than about 0.7 oz/yd².

5. A breathable material according to claim 2, wherein the low-elongation nonwoven layer comprises spunbonded polypropylene.

6. A breathable material according to claim 5, wherein the spunbonded polypropylene has a basis weight of greater than about 0.7 oz/yd².

7. A breathable material according to claim 5, wherein the spunbonded polypropylene has a basis weight equal to or greater than about 1 oz/yd².

8. A breathable material according to claim 1, wherein the crystalline polymer composition comprises at least 50 weight percent of high density polyethylene.

9. A breathable material according to claim 1, wherein the filler comprises calcium carbonate.

10. A breathable material according to claim 1, wherein the microporous coating comprises a single layer.

11. A breathable material according to claim 1, wherein the microporous coating comprises two or more layers.

12. A breathable material according to claim 1, further comprising a second fabric layer, wherein the coating is arranged between the low-elongation fabric layer and the second fabric layer.

13. A breathable material according to claim 1, having a water vapor transmission rate of greater than about 150 g/m²*24 hr.

14. A breathable material according to claim 13, having a water vapor transmission rate of less than about 2000 g/m²*24 hr.

15. A method of making the breathable material according to claim 1, comprising extrusion coating a low-elongation fabric layer with a composition comprising a crystalline polymer composition and a filler to form a coating on the low-elongation fabric layer, and incrementally stretching the coated low-elongation fabric layer to render the coating microporous.

16. A method according to claim 15, wherein the low-elongation fabric layer comprises a low-elongation nonwoven layer, and wherein the coating is formed on the nonwoven layer.

17. A method according to claim 16, wherein the coated nonwoven layer is incrementally stretched in the machine direction.

18. A method according to claim 16, wherein the coated nonwoven layer is incrementally stretched to an elongation less than about 2%.

19. A method according to claim 16, wherein the low-elongation nonwoven layer comprises polyethylene cross-laminated open mesh having a basis weight of greater than about 0.7 oz/yd².

20. A method according to claim 16, wherein the low-elongation nonwoven layer comprises spunbonded polypropylene having a basis weight of greater than about 0.7 oz/yd².

21. A method according to claim 15, wherein crystalline polymer composition comprises high density polyethylene.

22. A method according to claim 15, wherein the low-elongation fabric layer comprises a low-elongation woven layer.

23. A method according to claim 22, wherein the low-elongation woven layer is formed of polyethylene, polypropylene, or a combination thereof.

24. A breathable material according to claim 1, wherein the low-elongation fabric layer comprises a low-elongation woven layer.

25. A breathable material according to claim 24, wherein the low-elongation woven layer is formed of polyethylene, polypropylene, or a combination thereof.

26. A breathable housewrap material, comprising a low-elongation fabric layer exhibiting less than about 30% elongation as measured according to ASTM D5034 in at least one direction, and a microporous coating comprising high density polyethylene and a filler thereon.

27. A breathable housewrap material according to claim 26, wherein the low-elongation fabric layer comprises a polyolefin nonwoven layer.

28. A breathable housewrap material according to claim 27, wherein the low-elongation polyolefin nonwoven layer comprises polyethylene cross-laminated open mesh having a basis weight of greater than about 0.7 oz/yd$^2$.

29. A breathable housewrap material according to claim 27, wherein the low-elongation polyolefin nonwoven layer comprises spunbonded polypropylene having a basis weight of greater than about 0.7 oz/yd$^2$.

* * * * *